United States Patent [19]

Graveson et al.

[11] Patent Number: 6,110,978
[45] Date of Patent: Aug. 29, 2000

[54] FORMING SOLUTIONS

[75] Inventors: Ian Graveson, Nuneaton, United Kingdom; Kevin Philip, Carrigalina, Ireland; George Russell Ross, Bulkington; David Stephen Towlson, Wyken, both of United Kingdom

[73] Assignee: Acordis Acetate Chemicals Limited, Derby, United Kingdom

[21] Appl. No.: 09/043,320

[22] PCT Filed: Sep. 18, 1996

[86] PCT No.: PCT/GB96/02285

§ 371 Date: Jun. 10, 1998

§ 102(e) Date: Jun. 10, 1998

[87] PCT Pub. No.: WO97/10894

PCT Pub. Date: Mar. 27, 1997

[30] Foreign Application Priority Data

Sep. 22, 1995 [GB] United Kingdom .................... 9519394
Jun. 27, 1996 [GB] United Kingdom .................... 9613451

[51] Int. Cl.[7] .............................. B01F 17/00; B01F 3/12; C08L 1/26; D06M 9/00
[52] U.S. Cl. ................... 516/77; 516/31; 106/173.01; 106/162.82; 8/190; 252/8.91
[58] Field of Search .................... 106/173.01, 162.82; 8/190; 252/8.91; 516/77, 31

[56] References Cited

U.S. PATENT DOCUMENTS 4,978,541 12/1990 Stypula et al. .
5,310,424 5/1994 Taylor .
5,413,631 5/1995 Gray et al. .

FOREIGN PATENT DOCUMENTS

| 0 047 929 | 3/1982 | European Pat. Off. . |
| 0 347 988 | 12/1989 | European Pat. Off. . |
| 0 412 705 | 2/1991 | European Pat. Off. . |
| 6 -287 047 | 10/1994 | Japan . |
| 1 500 441 | 2/1978 | United Kingdom . |
| WO 94/09191 | 4/1994 | WIPO . |
| WO 95/28516 | 10/1995 | WIPO . |
| WO 96/28601 | 9/1996 | WIPO . |

OTHER PUBLICATIONS

Lewis et al., "Level fast dyeing of wool with nucleophilic aminoalkyl dyes and crosslinking agents. Part 1—Using a trifunctional crosslinking agent", *Journal of the Society of Dyers and Colourists*, vol. 111, pp. 12–18, Jan. 1995.

*Primary Examiner*—Jill Warden
*Assistant Examiner*—Monique T. Cole
*Attorney, Agent, or Firm*—Howson and Howson

[57] ABSTRACT

A method of forming a solution of a solid includes the steps of: (1) forming a dispersion which comprises (a) a liquid, (b) the solid dispersed in powder form and (c) a polymeric binder dissolved in the liquid, and (2) mixing the dispersion with the solvent under conditions such that the powder dissolves in the solvent. If a solution prepared by this method is allowed to dry out, the polymeric binder binds the powder and thus suppresses dust formation. The method has particular application to solids which are reactive textile auxiliaries. A dispersion of a solid in powder form in an aqueous liquid contains a major proportion of a low viscosity, water-soluble cellulose ether and a minor proportion of a natural polysaccharide gum.

21 Claims, No Drawings

FORMING SOLUTIONS

BACKGROUND OF THE INVENTION

This invention relates to pastes, slurries and dispersions of powders in liquids and has particular connection with methods for the safe handling of powdered solids, more especially during the preparation of solutions of such substances.

It is often necessary to measure and control the flow of a powdered solid into a process step. It is known that some powders, in particular those containing a high proportion of fine particles, are readily dispersible in the atmosphere and can give problems of dust formation. This may be a particular problem with toxic substances. It is also known that some powdered solids are susceptible to ignition or detonation. It is further known that some powdered solids are difficult to handle, for example when metering using a screw feeder. It may be convenient to disperse a powder in a suitable liquid to form a paste, slurry or dispersion (all such solid/liquid mixtures being on occasion referred to hereinafter as dispersions) both for ease of storage and transport and to alleviate such problems. The liquid is often and conveniently a process liquid, for example either the solvent (if it is desired to form a solution of the solid) or some other liquid required in or after the process step into which the solid is to be introduced. In other cases, an inert liquid or a volatile liquid which can subsequently be removed from the process by evaporation may be used.

Some dispersions are difficult to form, because the solid is not readily wetted by the liquid. It is known to include wetting agents in a dispersion to alleviate this difficulty. Some dispersions are unstable, in that the solid and liquid phases tend to separate on storage or when the dispersion is subjected to shearing forces, for example during pumping. It is known to include dispersing agents in a dispersion to inhibit such separation. For example, aqueous dispersions of the textile auxiliary 1,3,5-triacryloylhexahydro-1,3,5-triazine (TAHT) which contain a dispersing agent are described by D M Lewis et al. in Journal of the Society of Dyers and Colourists, Volume 111, January/February 1995, pages 12–18.

Nevertheless, there is always the risk that such dispersions may become dried out. This may happen for example with splashes or with residues in pipes and vessels. If this occurs, then any hazards associated with handling the dry powder can recur. It is an object of the invention to provide a means of guarding against such problems.

DISCLOSURE OF INVENTION

According to the invention there is provided a method of forming a solution of a solid in a solvent, including the steps of (1) forming a dispersion which comprises (a) a liquid, (b) the solid dispersed in powder form in the liquid and (c) a polymeric binder dissolved in the liquid, and (2) mixing the dispersion with the solvent under conditions such that the powder dissolves in the solvent.

The liquid is often a volatile liquid, and dispersions based on such liquids are liable to dry out. The liquid is often of low viscosity, for example up to about 10 mPa s (10 centipoise). Mixtures of liquids may be used. For many applications, the liquid may contain a major proportion of water or consist essentially of water, and in such cases the polymeric binder is a water-soluble polymer. Many water-soluble polymeric binders suitable for use in the invention are known in the art. Examples include cellulose ethers, for example carboxymethylcellulose and alkylcelluloses, linear polysaccharides such as sodium alginate, xanthan gum and guar gum, gelatin, poly(vinyl alcohol), poly(acrylamide) and polymers based on acrylic acid. The polymeric binder may be a film-forming polymer.

The liquid may be the same substance or mixture of substances as the solvent. In such a case it will be understood that additional solvent is required in step (2) of the method of the invention. It will be appreciated that in such a case the dispersion will contain both dissolved solid and dispersed powder. Such a dispersion can readily be diluted with further solvent to form a solution of accurately known concentration.

It has been found that dispersions both of solids which are relatively soluble in the liquid and of solids which exhibit a marked difference in solubility in the liquid over the range of temperatures experienced in handling the dispersion may tend to settle out on storage. This can be attributed to partial dissolution of the solid in and recrystallisation from the liquid. The solubility of the solid in the liquid is preferably less than 50, more preferably less than 5, grams per liter. The difference between the maximum and minimum solubility of the solid in the liquid over the temperature range experienced by the dispersion during normal handling is preferably less than 2 grams per liter.

The method of the invention may be of particular value if the solid is of relatively low solubility in the solvent. The method of the invention may advantageously be used when it is desired to control the concentration of dissolved solid in a circulating process liquor at a particular value.

The dispersion used in the method of the invention may additionally comprise additives of known types, for example wetting agents (which serve to assist in formation of the dispersion) and/or dispersing agents (which serve to maintain the powder in dispersion) and/or antifoaming agents. Suitable wetting, dispersing and antifoaming agents for any particular dispersion may readily be selected by trial and error. The proportion of dispersing agent (if used) in the dispersion is often in the range from 0.1 to 5 percent by weight. In general, only a trace of antifoaming agent (if used) is required, often in the range from 0.005 to 0.025 percent (50 to 250 ppm) by weight in the dispersion. In the case of aqueous dispersions of TAHT, examples of suitable dispersing agents include low-foaming anionic surfactants such as those based on substituted sodium napthalene sulphonates. Phosphated alcohol ethoxylates are also effective dispersing agents, but in general they have a higher foaming tendency and may accordingly be less preferred. Examples of materials which have in general been found to be less satisfactory in this application include phosphated alcohols and ammonium and sodium polyacrylates. Preferred examples of suitable antifoaming agents include non-ionic silicone antifoaming agents.

The concentration of powder in the dispersion used in the method of the invention may conveniently be that known for dispersions of that particular powder. It will readily be appreciated that the concentration of powder in the dispersion can be varied over wide limits depending on factors such as the nature of the powder and the equipment to be used in handling it. The proportion of the solid in the dispersion is often in the range from 20 to 60 percent by weight.

The average size by number of the particles in the powder is generally less than 750 micron, often less than 100 micron, and is usually greater than 0.1 micron. The average size by number of the particles may conveniently be in the range 10 to 400 micron. The method of the invention is applicable to particles both of low and especially of high aspect ratio (ratio of maximum to minimum dimension in the range from 2:1 to 100:1, often 10:1 to 100:1), including spheroids, flakes and needles.

The powder is often a reactive substance. Examples of powders which may be used in the invention include various types of textile auxiliaries. Such textile auxiliaries include chemicals capable of reacting with a textile to which they are applied. Such reactive textile auxiliaries are often conveniently applied to a textile from solution in a circulating bath, and the method of the invention is particularly suited to the manufacture of such solutions. Some such textile auxiliaries can be reacted with lyocell fibres to enhance the resistance to fibrillation of such fibres, as described in U.S. Pat. No. 5,310,424, the contents of which are incorporated herein by way of reference. A specific example of such a textile auxiliary is 1,3,5-triacryloylhexahydro-1,3,5-triazine (TAHT), whose use is described in published international patent applications WO-A-94/09191 and WO-A-95/28516 and in international patent application PCT/GB/00609 (publication date Sep. 19, 1996), the contents of all of which are incorporated herein by way of reference.

The method of the invention also finds use in the field of solutions of cellulose in an aqueous tertiary amine N-oxide solvent such as aqueous N-methylmorpholine N-oxide. As described for example in U.S. Pat. No. 5,413,631, the contents of which are incorporated herein by way of reference, such solutions can be prepared by evaporation of water from a slurry of cellulose in amine oxide and water. As described for example in EP-A-0,047,929, it is known to include in such solutions a small proportion of one or more thermal stabilisers. Suitable stabilisers include polyphenols such as gallic acid and its esters, including propyl gallate. The concentration of stabiliser in the solution is commonly in the range from 0.01 to 0.5 percent by weight. According to the invention, the stabiliser may conveniently be introduced into and dissolved in the slurry or solution of cellulose at a controlled rate by addition thereto of a dispersion which comprises from 20 to 60 percent by weight of stabiliser (partly in solution and partly dispersed as powder), from 40 to 80 percent by weight of water and from 0.01 to 3 percent by weight of a polymeric binder such as a water-soluble neutral cellulose ether, for example methyl cellulose or hydroxypropylmethyl cellulose.

When the powder is a reactive substance, care should be taken in the selection of the polymeric binder, because it will be appreciated that reaction between the powder and the polymeric binder in the dispersion or solution is often undesirable.

The minimum concentration of polymeric binder in the dispersion used in the method of the invention is desirably such that essentially all the powder is retained by the polymeric binder when the dispersion is dried. It will readily be appreciated that this concentration depends on the nature of the powder and its concentration in the dispersion. In general, it is unnecessary to use a significantly greater concentration of polymeric binder than this minimum amount in order to achieve the benefits of the invention, and it readily will be appreciated that the use of a greater concentration of the polymeric binder will in general result in increased processing costs. It will further be appreciated that this desirable minimum concentration of polymeric binder can readily be determined in any particular case by a process of trial and error. A concentration of polymeric binder in the dispersion in the range 0.1 to 5.0, on occasion 0.5 to 2.0, percent by weight may often be found appropriate. The polymeric binder in general has the additional advantage of serving as a viscosity modifier for the dispersion, whereby it assists in maintaining the solid in suspension therein on storage. Mixtures of polymeric binders may be used. In a preferred embodiment of the invention, the polymeric binder comprises a major proportion, often from 80 to 99.9, preferably from 90 to 99.5, percent by weight, of a film-forming polymer and a minor proportion, often from 0.1 to 20, preferably from 0.5 to 10, percent by weight, of a polymer with good suspending properties for dispersed solids, and the invention further provides a dispersion comprising such a mixture of polymers as binders. In the case of water-based systems, where the solvent is an aqueous liquid, examples of suitable film-forming polymers include water-soluble cellulose ethers, particularly neutral cellulose ethers such as methylcellulose and hydroxypropylmethylcellulose, and examples of polymers with good suspending properties include natural polysaccharide gums such as xanthan gum, guar gum and locust bean gum. Cellulose ethers are available commercially with controlled solution viscosities over a wide range. Low-viscosity cellulose ethers, for example of 2% solution viscosity measured under low-shear conditions at ambient temperature in the range from 1 to 20 mPa s, may be preferred. The polymer with good suspending properties generally has a 1% solution viscosity measured under low-shear conditions at ambient temperature in the range from 1,000 to 10,000 mPa s. (It will be recognised that the viscosity of water-soluble polymers is generally expressed in such manner in commerce.) The viscosity of solutions of gums such as xanthan gum tends to increase rapidly with increasing concentration even at very low concentrations, rendering viscosity control difficult if such a gum is used on its own. Accordingly, this embodiment confers a combination of good suspending properties, good film-forming properties and ready control of dispersion viscosity.

If the dispersion used in the method of the invention becomes dried out, the dried mixture of powder and polymeric binder can readily be collected for disposal or recovery while minimising any hazards associated with handling the free powder. The dried mixture may take the form of a more or less hard or pasty solid, depending on the nature of the polymeric binder and the other substances present.

The method of the invention is particularly suited to the handling of solids which may exhibit one or more hazardous properties when handled in powder form. Examples of such hazardous properties include acute or chronic toxicity to animals or plants, flammability (combustibility), and susceptibility to explosion.

The invention is illustrated by the following Example, in which parts and proportions are by weight unless otherwise specified:

EXAMPLE

Sellogen HR (Trade Mark of Henkel KGaA) (the surfactant sodium bis(l-methylethyl)naphthalene sulphonate) (1 part) was dissolved in water (53 parts). 1,3,5-Triacryloylhexahydro-1,3,5-triazine (TAHT) (45 parts) in powder form was added to the solution and the mixture was stirred for about 5 minutes using a high-shear mixer. RD Antifoam Emulsion (Trade Mark of Dow Corning Corp.) (a non-ionic silicone antifoaming agent) (0.005 part) was next added with gentle stirring so as to destroy any foam. The mixture was next stirred with a high-shear mixer under conditions such that a vortex was formed in it. Courgel T1225 (Trade Mark of Courtaulds Chemicals (Holdings) Limited) (a blend of water-soluble polymeric binders consisting of 99 parts hydroxypropylmethylcellulose with nominal 2% solution viscosity 5–6 mPa s measured under low-shear conditions at ambient temperature and 1 part xanthan gum) (1 part) was added slowly to the outermost edge of the vortex. After addition was complete, the mixture was stirred gently for about 20 minutes until the polymeric binder had completely dissolved. The resulting dispersion could then be diluted with water to yield an aqueous solution containing TAHT suitable for application to lyocell fibres. The dispersion exhibited good storage stability (resistance to settling out). When samples of the dispersion were allowed to dry out, a relatively dust-free solid was produced. In contrast, when a dispersion of TAHT in water not containing any polymeric binder (not according to the invention) is allowed to dry out, a fine dust is formed.

EXAMPLE 2

To 52.5 parts water at 65–75° C. was added 1.5 parts Courgel T1225 while stirring with a high-shear mixer. The mixture was allowed to cool, whereupon the Courgel T1225 (which is only slightly soluble in hot water) dissolved. To the cooled mixture was added TAHT (46 parts) with stirring, followed by a trace of silicone antifoam. The resulting dispersion could be diluted with water to yield a solution of TAHT.

EXAMPLE 3

Example 2 was repeated, except that the Courgel T1225 was added to 17.5 parts hot water with high-shear mixing and the resulting dispersion was rapidly diluted with 35 parts cold water and then stirred until the polymeric binders dissolved and the mixture cooled.

What is claimed is:

1. A method of forming a solution of a textile auxiliary in a solvent for said reactive textile auxiliary, comprising the steps of (1) forming a dispersion which comprises (a) a liquid, (b) said reactive textile auxiliary dispersed in powder form in said liquid, and (c) a polymeric binder dissolved in said liquid, and (2) mixing said dispersion with a sufficient amount of said solvent that said reactive textile auxiliary passes into solution.

2. A method according to claim 1, wherein the liquid and the solvent are the same substance or mixture of substances.

3. A method according to claim 1, wherein said reactive textile auxiliary is 1,3,5-triacryloylhexahydro-1,3,5-triazine.

4. A method according to claim 1, wherein the liquid comprises at least a major proportion of water and in that the polymeric binder is a water-soluble polymer.

5. A method according to claim 1, wherein the dispersion comprises from 0.1 to 5.0 percent by weight of the polymeric binder.

6. A method according to claim 1, wherein said reactive textile auxiliary in powder form consists of particles having an average size by number in the range from 10 to 400 micron.

7. A method according to claim 1, wherein the polymeric binder is a film-forming polymer.

8. A method according to claim 1, wherein the polymeric binder comprises from 80 to 99.9 percent by weight of a film-forming polymer and from 0.1 to 20 percent by weight of a natural polysaccharide gum.

9. A method according to claim 8, wherein the film-forming polymer is a cellulose ether having 2% solution viscosity in the range from 1 to 20 mPa s measured under low-shear conditions at ambient temperature.

10. A method according to claim 1, wherein the amount of said reactive textile auxiliary in the dispersion is in the range from 20 to 60 percent by weight.

11. A method according to claim 1, wherein said reactive textile auxiliary in powder form consists of particles having an aspect ratio in the range from 2:1 to 100:1.

12. A dispersion comprising (a) a reactive solid in powder form in an aqueous solution and (b) a dissolved polymeric binder which comprises (i) from 90 to 99.5 percent by weight of a water-soluble cellulose ether having 2% solution viscosity measured under low-shear conditions at ambient temperature in the range from 1 to 20 mPa s and (ii) from 0.5 to 10 percent by weight of a natural polysaccharide gum having 1% solution viscosity measured under low-shear conditions at ambient temperature in the range from 1,000 to 10,000 mPa s.

13. A dispersion according to claim 12, wherein the water-soluble cellulose ether is a neutral cellulose ether.

14. A dispersion according to claim 12, wherein the natural polysaccharide gum is selected from the group consisting of xanthan gum, guar gum and locust bean gum.

15. A dispersion according to claim 12, wherein the amount of polymeric binder in the dispersion is in the range from 0.1 to 5.0 percent by weight.

16. A dispersion according to claim 12, wherein the amount of solid in the dispersion is in the range from 20 to 60 percent by weight.

17. A dispersion according to claim 12, wherein the solid is a reactive textile auxiliary.

18. A dispersion of 1,3,5-triacryloylhexahydro-1,3,5-triazine, in powder form in an aqueous solution, said dispersion containing dissolved therein a polymeric binder which comprises (a) from 80–99.9 parts by weight of a water-soluble cellulose ether having 2% solution viscosity measured under low-shear conditions at ambient temperature in the range from 1 to 20 mPa s and (b) from 0.1 to 20 parts by weight of a natural polysaccharide gum having 1% solution viscosity measured under low-shear conditions at ambient temperature in the range from 1,000 to 10,000 mPa s.

19. A method for safely handling a reactive solid, comprising the steps of forming an aqueous solution of a reactive textile auxiliary solid in a solvent for said reactive textile auxiliary, said solution formed by (1) dispersing in a liquid, (a) said reactive textile auxiliary in powder form and (b) a polymeric binder which does not react with said solid, said binder comprising a water-soluble cellulose ether and a natural polysaccharide gum, said binder employed in a minimum concentration wherein all of said binder retains all of said powder when said dispersion is dried, and (2) mixing said dispersion with a sufficient amount of said solvent that said reactive textile auxiliary passes into solution.

20. The method according to claim 19, wherein said polymeric binder comprises (i) from 89 to 99.9 parts by weight of a water-soluble cellulose ether having 2% solution viscosity measured under low-shear conditions at ambient temperature in the range from 1 to 20 mPa s and (ii) from 0.1 to 20 parts by weight of a natural polysaccharide gum having 1% solution viscosity measured under low-shear conditions at ambient temperature in the range from 1,000 to 10,000 mPa s.

21. The method according to claim 19, wherein said reactive textile auxiliary is 1,3,5-triacryloylhexahydro-1,3, 5-triazine.

* * * * *

UNITED STATES PATENT AND TRADEMARK OFFICE
CERTIFICATE OF CORRECTION

PATENT NO. : 6,110,978
DATED : August 29, 2000
INVENTOR(S) : Ian Graveson, Kevin Philip, George Russell Ross, and David Stephen Towlson It is certified that error appears in the above-indentified patent and that said Letters Patent is hereby corrected as shown below:

On the cover page, in the Assignee [73], after "Derby, United Kingdom", add
-- Acordis Fibres (Holdings) Limited, Derby, United Kingdom --.

Signed and Sealed this

First Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,110,978
DATED : August 29, 2000
INVENTOR(S) : Ian Graveson et al.

It is certified that error appears in the above-indentified patent and that said Letters Patent is hereby corrected as shown below:

Column 5, line 33, insert --reactive-- after the third occurrence of "a".

Signed and Sealed this

Fifteenth Day of May, 2001

Attest:

NICHOLAS P. GODICI

Attesting Officer     Acting Director of the United States Patent and Trademark Office